No. 686,893.  
C. L. FERRIOTT.  
CORN OR COTTON PLANTER.  
(Application filed June 17, 1901.)  
Patented Nov. 19, 1901.

(No Model.)

2 Sheets—Sheet 1.

C. L. Ferriott, Inventor

Witnesses:

No. 686,893. Patented Nov. 19, 1901.
C. L. FERRIOTT.
CORN OR COTTON PLANTER.
(Application filed June 17, 1901.)
(No Model.) 2 Sheets—Sheet 2.
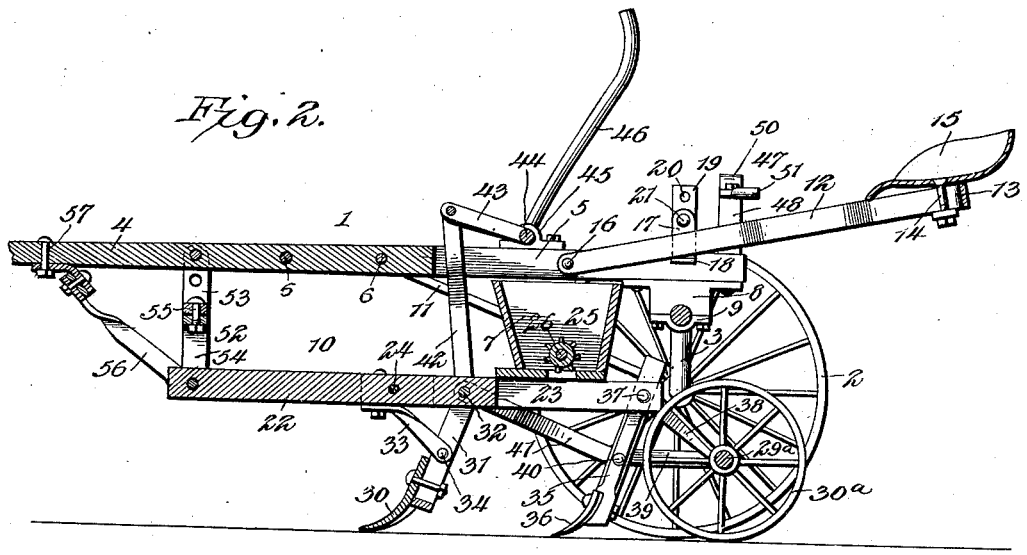
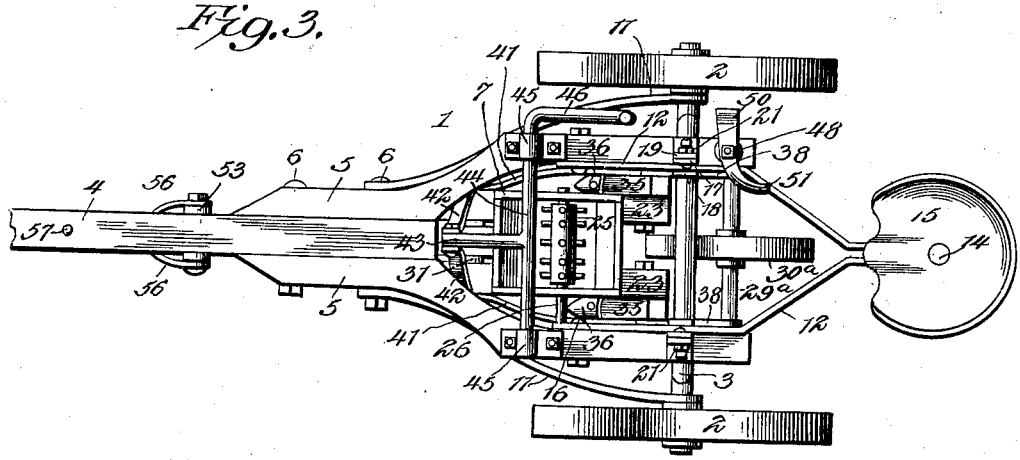
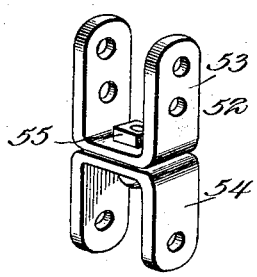
C. L. Ferriott, Inventor;
Witnesses

UNITED STATES PATENT OFFICE.

CHARLEY L. FERRIOTT, OF BARTLETT, TEXAS.

CORN OR COTTON PLANTER.

SPECIFICATION forming part of Letters Patent No. 686,893, dated November 19, 1901.

Application filed June 17, 1901. Serial No. 64,900. (No model.)

*To all whom it may concern:*

Be it known that I, CHARLEY L. FERRIOTT, a citizen of the United States, residing at Bartlett, in the county of Williamson and State of Texas, have invented a new and useful Corn or Cotton Planter, of which the following is a specification.

This invention relates to corn and cotton planters; and the object of the invention is to present a simply-constructed, cheap, and durable form of device for the purpose in which in operation the running of the furrow and the planting of the seed may be properly effected irrespective of any side shake or lateral movement of the supporting-frame.

A further object is to provide a simple and efficient means whereby the actuating mechanism may be lifted clear of the ground when desired.

A further object is to provide a novel form of brace or support for the wheel of a plow-carrying frame, the supporting of this wheel upon the frame being such that it will be thoroughly braced against any tendency to wabble or yield to side pressure under the operation of the machine.

A further object is to provide a novel form of swivel connection between the plow-carrying frame and supporting-frame, the connection to be such as to permit vibration of the plow-carrying frame, thus to cause the plow to travel in a right line and the seedbox always to occupy a horizontal position irrespective of the position of the supporting-wheels of the main frame.

With these and various other objects in view, as will hereinafter appear, the invention consists in the novel construction and combination of parts of a novel form of corn and cotton planter, as will be hereinafter fully described and claimed.

In the accompanying drawings, forming a part of this specification, and in which like numerals of reference indicate corresponding parts, I have exhibited a form of embodiment of my invention embodying the essential features thereof, it being understood that the ideas embodied therein may be otherwise combined without departing from the spirit of the invention.

Figure 1:
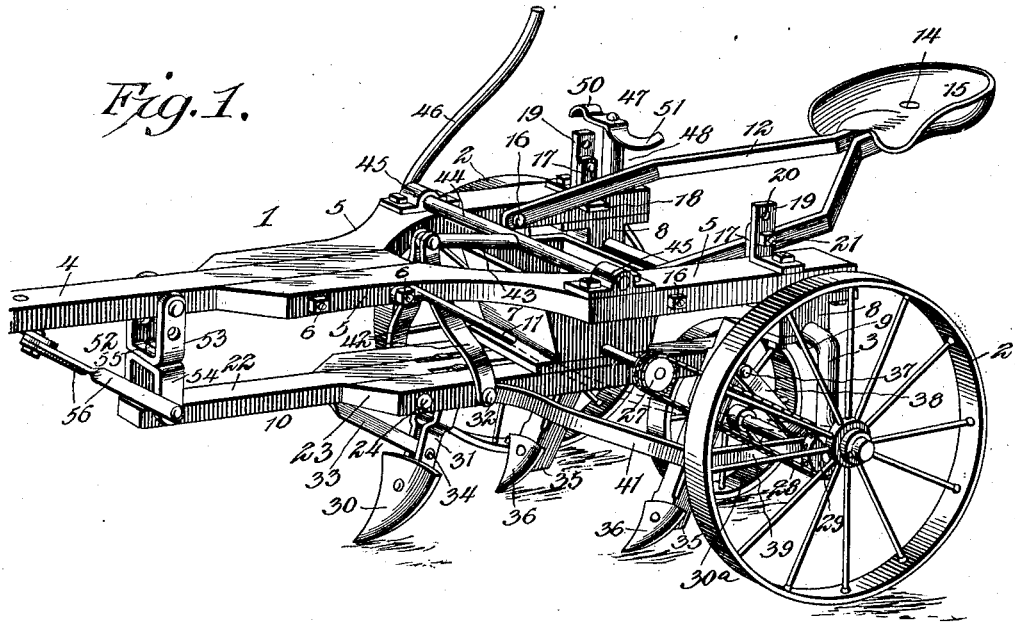
Figure 4:
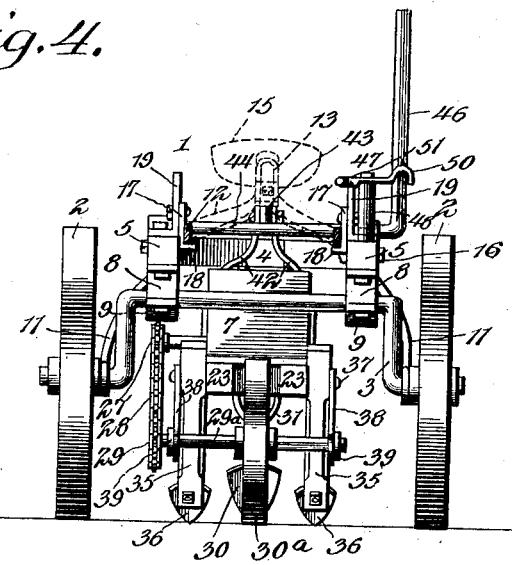

In the drawings, Figure 1 is a view in perspective of the apparatus. Fig. 2 is a longitudinal section. Fig. 3 is a view in plan. Fig. 4 is a view in rear end elevation. Fig. 5 is a detached perspective detail view of the swivel attachment.

Referring to the drawings, 1 designates the main supporting-frame, and 2 the supporting-wheels, supported by an axle 3, secured near the rear portion of the supporting-frame. The supporting-frame 1 comprises a tongue or pole 4, to which the horses are attached, as usual, and secured to this pole at its rear end are two frame-arms 5, the arms being associated with the pole by bolts 6. These arms diverge outward and then extend in parallel relation with each other to their terminals, the space between the arms affording room to accommodate the seedbox 7. To the rear end portion of the arms are secured blocks 8, against which is bolted the axle 3, the connection between the blocks and the axle in this instance being effected by clamps 9. The manner of assembling the axle with the blocks may be varied from the construction shown, and for this reason it is to be understood that the invention is not to be limited to the precise form of connection here shown. The axle 3 is arched to raise the supporting-frame 1 a sufficient distance above the ground to permit operation of the plow-carrying frame 10, which will presently be described. The axle is braced against any tendency to rock by stay-rods 11, each having at one end an eye to pass around the spindle portion of the axle and at the other end an eye to engage one of the bolts 6, the eyes of the two stay-rods being clamped against the side of the arms 5 by the head of the bolt and by the nut thereon. By thus associating the stay-rods with the main frame these rods may be readily detached when desired.

Pivotally connected with the inner sides of the rear portion of the arms 5 is the seat-support 12, the same in this instance being constructed of a piece of resilient metal bent upon itself to form a loop 13 at its back, through which passes a bolt 14 for holding the seat 15 in place, the seat to be of any preferred construction, preferably one contoured to render it easy of occupancy. The arms of the seat-support diverge outwardly from a point adjacent to the seat and then extend in parallel relation with each other for the remainder of their length and are held assembled with the arms 5 by screws or bolts 16. The means for holding the seat-support in a practically horizontal plane consists of two hangers 17, each provided at its lower portion with a toe or flange 18, on which the arms of the seat-support rest. Each hanger is secured to a bracket 19, bolted to the upper side of the arms 5, the bracket being approximately L-shaped in elevation, this form being best adapted for the purpose designed. The brackets may, however, be of different shape from that shown. The hangers are adjustably connected with the brackets in order to permit adjustment of the seat to suit the rider and in this instance effected by providing each bracket with a plurality of openings 20 to be engaged by bolts or screws 21, passing through the hangers and into the brackets. By this simple yet effective arrangement the seat may be readily adjusted to the desired height.

The plow-carrying frame 10 comprises a beam 22 and two arms 23, secured thereto by a bolt 24. Upon the arms 23 is mounted a seedbox 7, which may be of any ordinary or preferred construction and provided with the usual stirrer-cylinder 25, the cylinder-shaft 26 carrying at one end, exteriorly of the box, a sprocket-wheel 27, around which passes a sprocket-chain 28 to and around a sprocket-wheel 29 of a shaft $29^a$, supported at the rear of the plow-carrying frame. The shaft $29^a$ carries a wheel $30^a$, this wheel to engage with the ground only when the plow-carrying frame is depressed and through which wheel motion is imparted to the seed-cylinder, thereby to effect feeding of the seed. It will be seen that by the provision of this wheel, which, as stated, only contacts with the ground when the machine is in actual operation, any waste of seed will be obviated, and, further, by the employment of this device any cut-off mechanism for the seedbox to be operated by the driver will be rendered entirely unnecessary, as the feed of seed only takes place when the said wheel is rotated by contact with the ground. Secured to the beam 22 is the main shovel or plow 30, the same being carried by the yoke or standard 31, the members of which pass between the sides of the beam and the arms 23 and is held in position therein by a bolt 32. To hold the yoke rigid with the beam, a brace 33 is employed, one end of which is securely bolted to one side of the beam and the other end passed between the members of the yoke and held there by the bolt 34.

Secured near the rear portion of the arms 23 are two standards 35, the lower ends of which carry the coverers 36, which may be of any preferred construction and operate in a well-known manner to cover the soil in over the seed as the same is fed from the seedbox. The standards 35 are held associated with the arms 23 by bolts 37, and to support the shaft $29^a$ in operative position two brackets 38 and 39 are employed, the rear ends of these brackets being provided with openings to fit on the shaft $29^a$ and the front ends being provided with similar openings, the bracket 38 being held in place on the standard by the bolts 37, that connect the standard with the supporting-frame, and the bracket 39 by bolts 40, the latter bolts being connected with the standard about intermediate of their lengths. Held in place by the bolts 40 and serving in addition to brace the standards against back thrust are brace-rods 41, the outer ends of which are associated with the arms 23 by the bolt 32, and also mounted on this bolt 32 are two arms 42, swiveled on the bolt and secured at their upper or free ends to a projection 43 on a crank-shaft 44, working in suitable journals 45 on the top of the plow-carrying frame, the journal-boxes 45 to be of any preferred construction, the form shown here being one that will be effective for the purpose designed. The crank-shaft 44 is provided with an arm 46, extending parallel with the length of the frame and backward a sufficient distance to be within the reach of the operator, the arm being held against lifting when it is desired to keep the plow-carrying frame out of engagement with the ground by a cleat or hook 47, mounted upon a standard 48 on one of the arms 5, the cleat being provided with a curved offset 50 to engage with the arm and with a projection 51 by which it may be operated.

The means for connecting the plow-carrying frame with the main frame constitutes one of the essential features of this invention and comprises a swivel-joint 52, by means of which the plow-carrying frame will be free to move vertically and also laterally, so that under the operation of the machine should the supporting-wheels 2 wabble or run counter to the furrow being plowed the plow-supporting frame will always remain true to the line of draft, and thereby effect proper plowing, depositing of the seed, and the covering in of the soil over the seed. The swivel comprises two approximately U-shaped members 53 54, the member 53 being secured to the pole 4 and the member 54 to the beam 22 near its outer end. The connection between the pole and the swivel member carried thereby is rigid, and the connection between the plow-carrying frame and its swivel is such as to permit pivotal movement of the latter frame with the swivel member, thereby, as before pointed out, to permit the frame being moved vertically through the arc of a circle by the crank-shaft. The two swivel members are held assembled by a bolt or rivet 55, the assemblage being a loose one, so that the lower member 54 will have a rocking connection with the upper member 53. To brace the lower member 54, whereby the plow-carrying frame will be firmly supported at its outer end, brace-arms 56 are employed, these passing on the outside of the swivel member 54 and are held in place there by the bolt that holds the member assembled with the beam 22, the upper member of these arms converging and being secured to the under side of the pole by a bolt 57.

It is to be understood that in carrying the invention into effect the arrangement and construction of the parts herein shown may be widely departed from without departing from the spirit of the invention.

The operation of the device is as follows: The apparatus is driven to the field, the plow-carrying frame being held in elevated position above the ground by the crank-shaft and its arm, the seedbox having been previously supplied with either cotton-seed or corn, as the case may be. The horses are now started and the plow-carrying frame is dropped to the ground. As soon as the wheel 30ª strikes the ground the seed-feeding mechanism is actuated to deposit the seed in the furrow made by the shovel 30, the soil being immediately turned over upon the seed by the coverers 36. Should the ground be uneven and the main supporting-frame be tilted to one side or the other, this will be compensated for to effect proper operation of the plow by the swiveled connection between the plow-carrying frame and the main frame, whereby, as before pointed out, the coöperative relation between the plows and the ground always remain the same irrespective of any inclination or tilt of the main frame.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

What I claim is—

1. In a planter, the combination of a rearwardly-forked main wheeled frame, a plow-carrying frame located below the main frame and having its forward end loosely connected therewith so as to turn thereon, a seedbox carried by the plow-carrying frame and disposed between and below the forked members of the main frame, and adapted when raised to fit between the forked members of the main frame, a ground-wheel mounted upon the rear portion of the plow-carrying frame, a feed connection between the ground-wheel and the seedbox, a rock-shaft extending transversely of the forked portion of the main frame and provided with a lever-handle, and a lateral arm, a link connection between the arm and the plow-carrying frame, and a seat supported upon the forked members of the main frame beyond the seedbox.

2. In a planter, the combination of a rearwardly-forked main wheeled frame, a plow-carrying frame located below the main frame and having its forward end loosely connected therewith so as to turn thereon, a seedbox carried by the plow-carrying frame and disposed between and below the forked members of the main frame, and adapted when raised to fit between the said forked members, elevating means mounted on the main frame and connected to the plow-carrying frame, and a seat supported on the forked members of the main frame and projected in rear of the seedbox.

3. In a planter, the combination with a main wheeled frame, of a plow-carrying frame located below the former frame, opposite standards pendent from the plow-carrying frame, braces extending forwardly from the standards to the plow-carrying frame, pairs of hangers projected rearwardly from the plow-carrying frame and secured respectively by the fastenings which connect the adjacent standard to the plow-carrying frame and to the forwardly-directed brace, a shaft mounted in the rear ends of the hangers, a ground-wheel mounted upon the shaft, a seedbox mounted upon the plow-carrying frame, a feed connection between the box and the ground-wheel, and means for raising the plow-carrying frame to elevate the plows thereof and the ground-wheel out of contact with the ground.

4. A corn and cotton planter comprising a main supporting-frame, a plow-supporting frame, and a swivel connecting the forward portions of the two frames, said swivel comprising two pivotally-connected yokes provided with means of attachment to the respective frames.

5. A corn and cotton planter comprising a main supporting-frame, a swivel connecting the forward portion of the two frames, said swivel comprising two pivotally-connected yokes provided with means of attachment to the respective frames, and brace-arms secured to the swivel member of the plow-carrying frame and to the main supporting-frame.

6. In a corn and cotton planter, a main or supporting frame comprising a tongue and two diverging members supported upon wheels, a plow-carrying frame disposed beneath the main frame and connected therewith at the front, and a seat-support provided with two arms one of which is secured to each of the diverging members of the main frame.

In testimony that I claim the foregoing as my own I have hereto affixed my signature in the presence of two witnesses.

CHARLEY L. FERRIOTT.

Witnesses:
C. F. ANDREWS,
STANTON ALLEN.